United States Patent
Komoriya et al.

(10) Patent No.: US 11,645,822 B2
(45) Date of Patent: May 9, 2023

(54) DISPLAY SYSTEM AND DISPLAY DEVICE FOR RENDERING OF A VIRTUAL OBJECT OF A DEPARTURE POINT

(71) Applicant: TOYOTA JIDOSHA KABUSHIKI KAISHA, Toyota (JP)

(72) Inventors: Kazuki Komoriya, Toyota (JP); Kazumi Serizawa, Toyota (JP); Sayaka Ishikawa, Miyoshi (JP); Shunsuke Tanimori, Nagoya (JP); Masaya Miura, Toyota (JP); Kouji Tamura, Tokyo (JP); Seiei Hibino, Nagakute (JP); Rina Mukai, Toyota (JP); Tomoya Inagaki, Miyoshi (JP); Chinli Di, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/552,797

(22) Filed: Dec. 16, 2021

(65) Prior Publication Data

US 2022/0198761 A1   Jun. 23, 2022

(30) Foreign Application Priority Data

Dec. 21, 2020   (JP) .............................. JP2020-210995

(51) Int. Cl.
*G06T 19/00*       (2011.01)
*G06V 20/59*       (2022.01)
(Continued)

(52) U.S. Cl.
CPC .............. *G06T 19/006* (2013.01); *B60R 1/22* (2022.01); *G06V 20/20* (2022.01); *G06V 20/56* (2022.01);
(Continued)

(58) Field of Classification Search
CPC ...... G06T 19/006; G06V 20/59; G06V 20/20; G06V 40/10; G06V 20/56; B60R 1/00;
(Continued)

(56) References Cited

U.S. PATENT DOCUMENTS

2014/0321702 A1* 10/2014 Schmalstieg .......... G06V 20/00
382/103
2016/0224827 A1*  8/2016 Haley .................... G07C 5/008
(Continued)

FOREIGN PATENT DOCUMENTS

JP       2014-020863 A        2/2014
JP       2014020863  A  *    2/2014
(Continued)

*Primary Examiner* — Terrell M Robinson
(74) *Attorney, Agent, or Firm* — Sughrue Mion, PLLC

(57) ABSTRACT

When a theme park that is a facility configured based on a specific theme is set as a departure point, an AR display device transmits information of the theme park of the departure point to a server. The server includes a theme park-specific character storage unit and a transmission unit. The theme park-specific character storage unit stores information on a character set for the theme park of the departure point. The transmission unit transmits, to the AR display device, image data of the character set for the theme park of the departure point, with the character being set as a virtual object of the departure point.

5 Claims, 17 Drawing Sheets

(51) Int. Cl.
  *G06V 40/10*   (2022.01)
  *G06V 20/20*   (2022.01)
  *B60R 1/22*    (2022.01)
  *G06V 20/56*   (2022.01)
  *H04N 23/90*   (2023.01)

(52) U.S. Cl.
  CPC .............. *G06V 20/59* (2022.01); *G06V 40/10* (2022.01); *H04N 23/90* (2023.01); *B60R 2300/10* (2013.01); *B60R 2300/20* (2013.01); *B60R 2300/30* (2013.01)

(58) Field of Classification Search
  CPC ............ B60R 2300/10; B60R 2300/20; B60R 2300/30; H04N 5/247
  See application file for complete search history.

(56) References Cited

U.S. PATENT DOCUMENTS

| | | | | |
|---|---|---|---|---|
| 2018/0040162 | A1* | 2/2018 | Donnelly | G02B 27/0179 |
| 2019/0381406 | A1* | 12/2019 | Jung | G06T 7/70 |
| 2020/0351478 | A1* | 11/2020 | Hachisuka | G06V 20/46 |

FOREIGN PATENT DOCUMENTS

| | | |
|---|---|---|
| JP | 2016-522485 A | 7/2016 |
| WO | 2014/178966 A1 | 11/2014 |

* cited by examiner

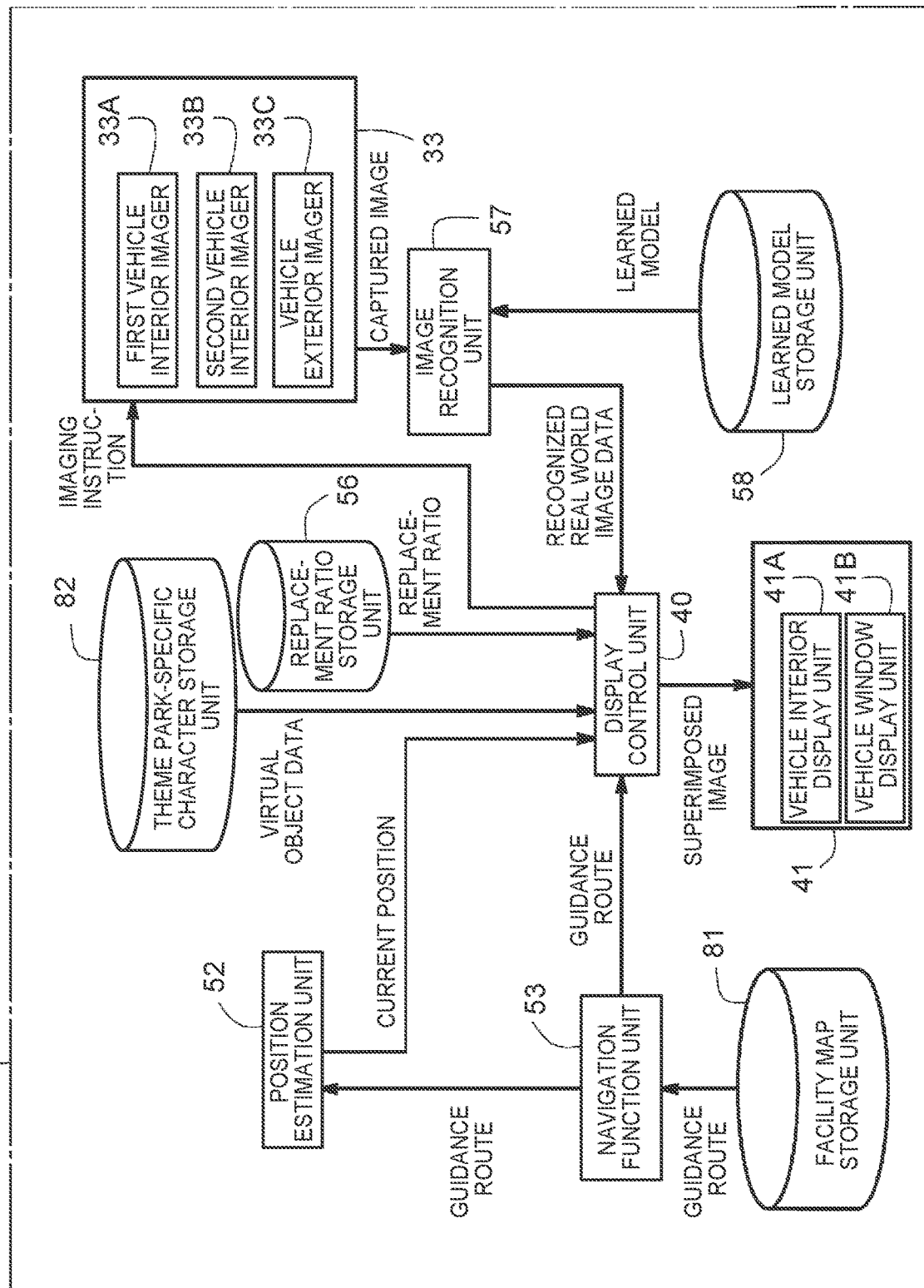

DISPLAY SYSTEM AND DISPLAY DEVICE FOR RENDERING OF A VIRTUAL OBJECT OF A DEPARTURE POINT

CROSS-REFERENCE TO RELATED APPLICATION

This application claims priority to Japanese Patent Application No. 2020-210995 filed on Dec. 21, 2020, incorporated herein by reference in its entirety.

BACKGROUND

1. Technical Field

The present specification discloses a display system and a display device included in the display system that enable display of an augmented reality image (AR image).

2. Description of Related Art

A display device using augmented reality (AR) technology has been known. For example, in Japanese Unexamined Patent Application Publication No. 2014-20863 (JP 2014-20863 A), in a navigation system, an augmented reality image (AR image) is displayed on a display, in which a virtual image of a character traveling along a route to a destination is superimposed on an image of the real world.

SUMMARY

For example, if users of a theme park having a concept configured based on a specific theme (subject) can be provided with services based on this concept even after leaving the theme park, the customer satisfaction level will be improved.

Therefore, the present specification discloses a display system and a display device included in the display system that can provide users of a facility such as a theme park with services based on the concept of the facility even after the users leave the facility.

The present specification discloses a display system. The display system includes a display device and a server wirelessly connected to the display device. The display device is movable with a user. The display device includes a display unit and a display control unit. The display control unit is configured to display, on the display unit, an augmented reality image in which an image of a virtual object is superimposed on scenery of a real world. When a facility configured based on a specific theme is set as a departure point, the display device transmits facility information of the departure point to the server. The server includes a storage unit and a transmission unit. The storage unit stores information on a character set for the facility of the departure point. The transmission unit transmits, to the display device, image data of the character set for the facility of the departure point, with the character being set as a virtual object of the departure point.

According to the above configuration, since the character set for the facility such as a theme park serving as the departure point is displayed in the virtual reality image, it is possible to provide services based on the concept of the facility even after the user leaves the facility.

In the above configuration, the display device may be mounted on a vehicle. In this case, the display unit is disposed to separate a plurality of seats in a vehicle cabin, and includes a first display surface and a second display surface, the first display surface and the second display surface being positioned back to back and each facing to a side of the vehicle cabin. The display device includes a first imager, a second imager, and an image recognition unit. The first imager captures an image of the vehicle cabin on the second display surface side, and the image captured by the first imager is displayed on the first display surface. The second imager captures an image of the vehicle cabin on the first display surface side, and the image captured by the second imager is displayed on the second display surface. The image recognition unit performs image recognition on the image captured by each of the first imager and the second imager. When the image recognition unit recognizes a person in the captured image, the display control unit generates the captured image in which an image region of the recognized person is replaced with the virtual object of the departure point to display the captured image on each of the first display surface and the second display surface.

According to the above configuration, since people (passengers) adjacent to each other across the display unit are replaced with virtual objects to be displayed, the people can obtain an experience as if they were riding in the vehicle together with the virtual objects.

In the above configuration, the display device may be mounted on a vehicle. In this case, the display unit is attached to a vehicle window and includes a display surface facing an interior of a vehicle cabin. The display device includes an imager and an image recognition unit. The imager captures an image of scenery outside the vehicle. The image recognition unit performs image recognition on the image captured by the imager. When the image recognition unit recognizes a person in the captured image, the display control unit generates the captured image in which an image region of the recognized person is replaced with the virtual object of the departure point to display the captured image on the display surface.

According to the above configuration, since the people outside the vehicle are replaced with virtual objects and displayed on the display surface that is a vehicle window, the passengers can obtain an experience as if they were traveling by the vehicle in a facility such as a theme park.

In the above configuration, the display control unit may decreases a ratio of an image area of the person that is replaced with the virtual object of the departure point with respect to image areas of all recognized people, as a distance from the facility of the departure point increases.

According to the above configuration, it is possible to produce an effect that the number of characters of the facility that see off the passengers decreases as the distance from the facility of the departure point increases.

In the above configuration, the storage unit may store information on a character set for a facility serving as a destination. In this case, the transmission unit transmits, to the display device, image data of the character set for the facility of the destination, with the character being set as a virtual object of the destination. The display control unit increases the ratio of an image area of a person that is replaced with the virtual object of the destination with respect to image areas of all recognized people, as a distance from the facility of the destination decreases.

According to the above configuration, it is possible to produce an effect that the number of characters of the facility that welcome the passengers increases as the distance from the facility of the destination decreases.

In the above configuration, a plurality of characters may be set in the storage unit as virtual objects of the departure point and virtual objects of the destination. In this case, the display control unit selects the characters of the virtual objects for replacement in accordance with time of a day.

According to the above configuration, it is possible to produce an effect that diurnal animals are displayed as the virtual objects during the daytime and nocturnal animals are displayed as the virtual objects after sunset.

The present specification also discloses a display device mounted on a vehicle. The display device includes a storage unit, an extraction unit, a display unit, and a display control unit. The storage unit stores information on a character set for a facility configured based on a specific theme. The extraction unit extracts a character set for a facility that is set as a departure point, as a virtual object of the departure point. The display unit includes a display surface facing an interior of a vehicle cabin. The display control unit is configured to display, on the display unit, an augmented reality image in which an image of a virtual object of the departure point is superimposed on scenery of a real world.

With the display system and the display device disclosed in the present specification, it is possible to provide users of a facility such as a theme park with services based on the concept thereof even after the users leave the facility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 17 is a diagram illustrating another example of the functional blocks of the display device.

DETAILED DESCRIPTION OF EMBODIMENTS

Configuration of Complex Entertainment Facility

Figure 1:
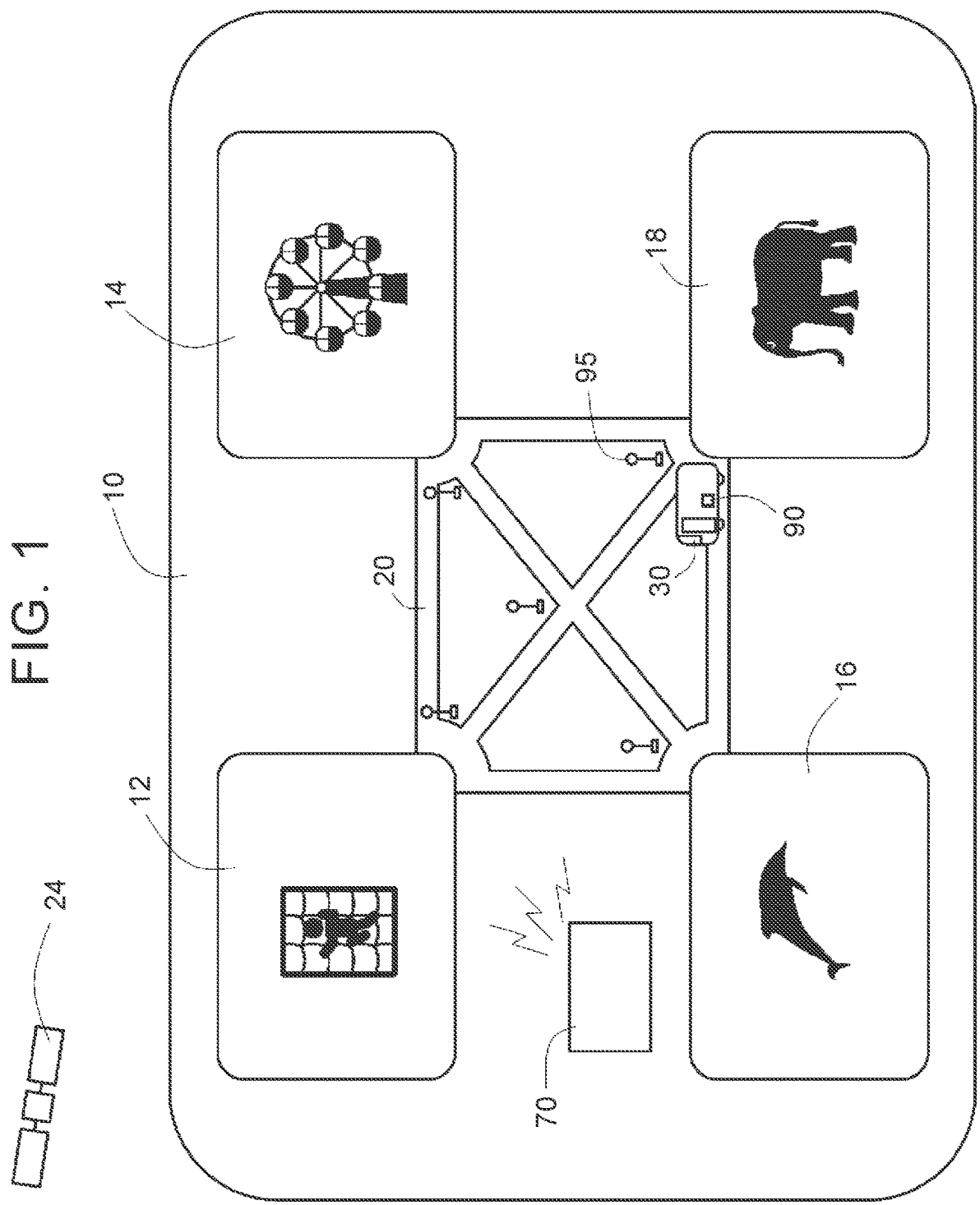
FIG. 1 is a diagram illustrating a complex entertainment facility including a display system according to the present embodiment.

FIG. 1 illustrates a complex entertainment facility 10. In this facility, a display system according to the present embodiment is used. The complex entertainment facility 10 includes a plurality of theme parks 12 to 18. The theme park refers to a facility having a concept based on a specific theme (subject) and including facilities, events, scenery, and the like that are comprehensively organized and produced based on that concept.

Figure 8:
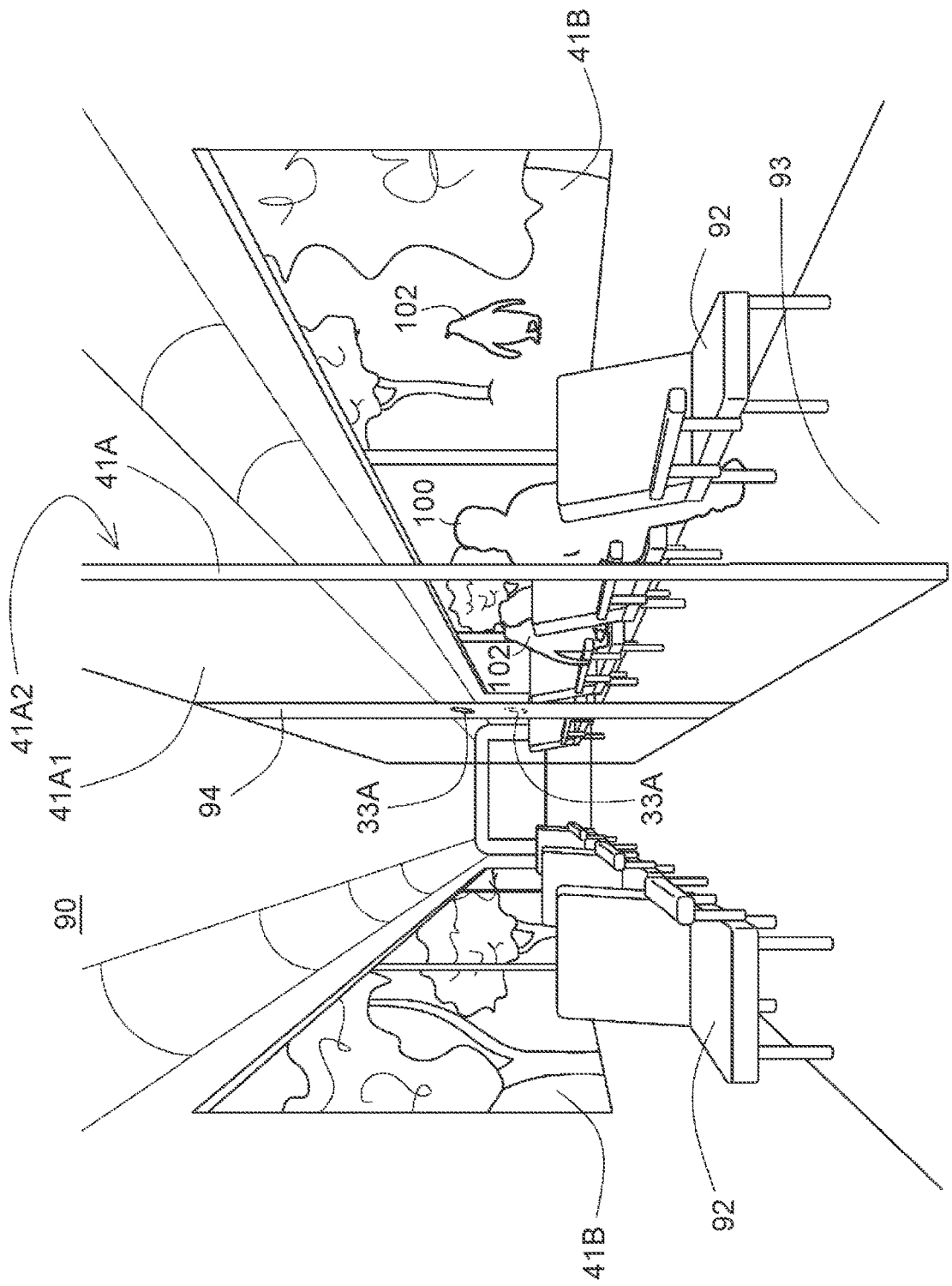
FIG. 8 is a diagram illustrating an example in which an augmented reality image is displayed on a display unit in the vehicle cabin.

The complex entertainment facility 10 includes theme parks having different themes. For example, the complex entertainment facility 10 includes an athletic park 12, an amusement park 14, an aquarium 16, and a zoo 18 as the theme parks. Characters of virtual objects are set for each of the theme parks 12 to 18 based on their respective themes. As shown in FIG. 8, which will be described later, the virtual objects are used for displaying an augmented reality image (AR image) on a display unit 41 (a vehicle interior display unit 41A and vehicle window display units 41B) in a vehicle 90.

The characters of the virtual objects are set so as to match the theme and the concept of each of the theme parks 12 to 18. For example, for the athletic park 12, characters such as adventurers, rangers, and ninjas are set as the virtual objects. For example, for the amusement park 14, characters such as clowns and go-karts are set as the virtual objects. For example, for the aquarium 16, characters such as dolphins, goldfish, and penguins are set as the virtual objects. Further, for example, for the zoo 18, characters such as elephants, pandas, and bears are set as the virtual objects. The information on these set virtual objects is stored in a theme park-specific character storage unit 82 (see FIG. 5) of a server 70. Details of the stored virtual object information will be described later.

Configuration of Vehicle

The theme parks 12 to 18 are connected to each other by a connecting passage 20. The vehicle 90 travels on the connecting passage 20. The vehicle 90 may be a shared bus that connects the theme parks 12 to 18, for example. The vehicle 90 may be manually driven by a driver or may be provided with an autonomous driving function. Regarding the autonomous driving function, the vehicle 90 can operate at level 4 (highly automated driving) or level 5 (fully automated driving), based on the standards set by the Society of Automotive Engineers (SAE International) of the United States, for example.

Figure 2:
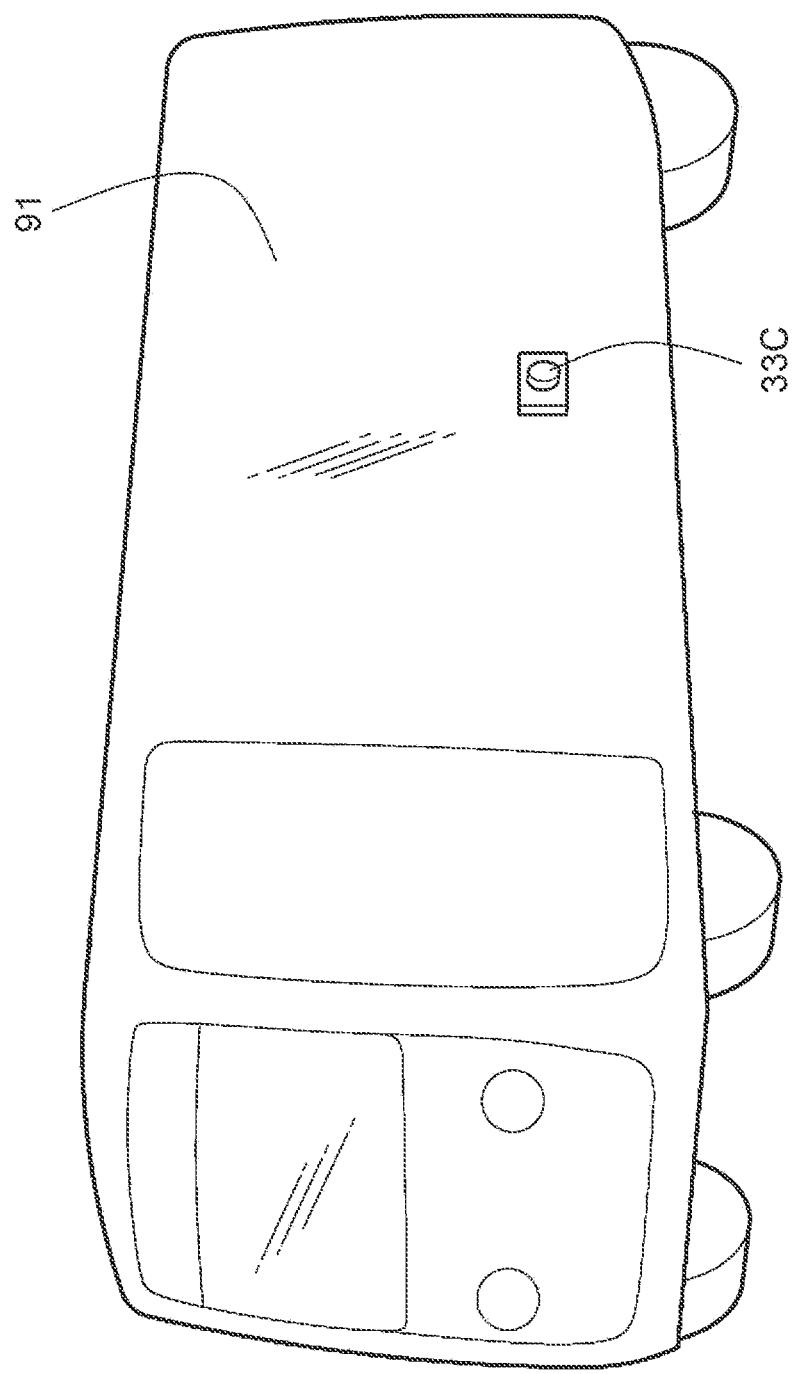
FIG. 2 is a perspective view illustrating a vehicle traveling on a connecting passage.
Figure 3:
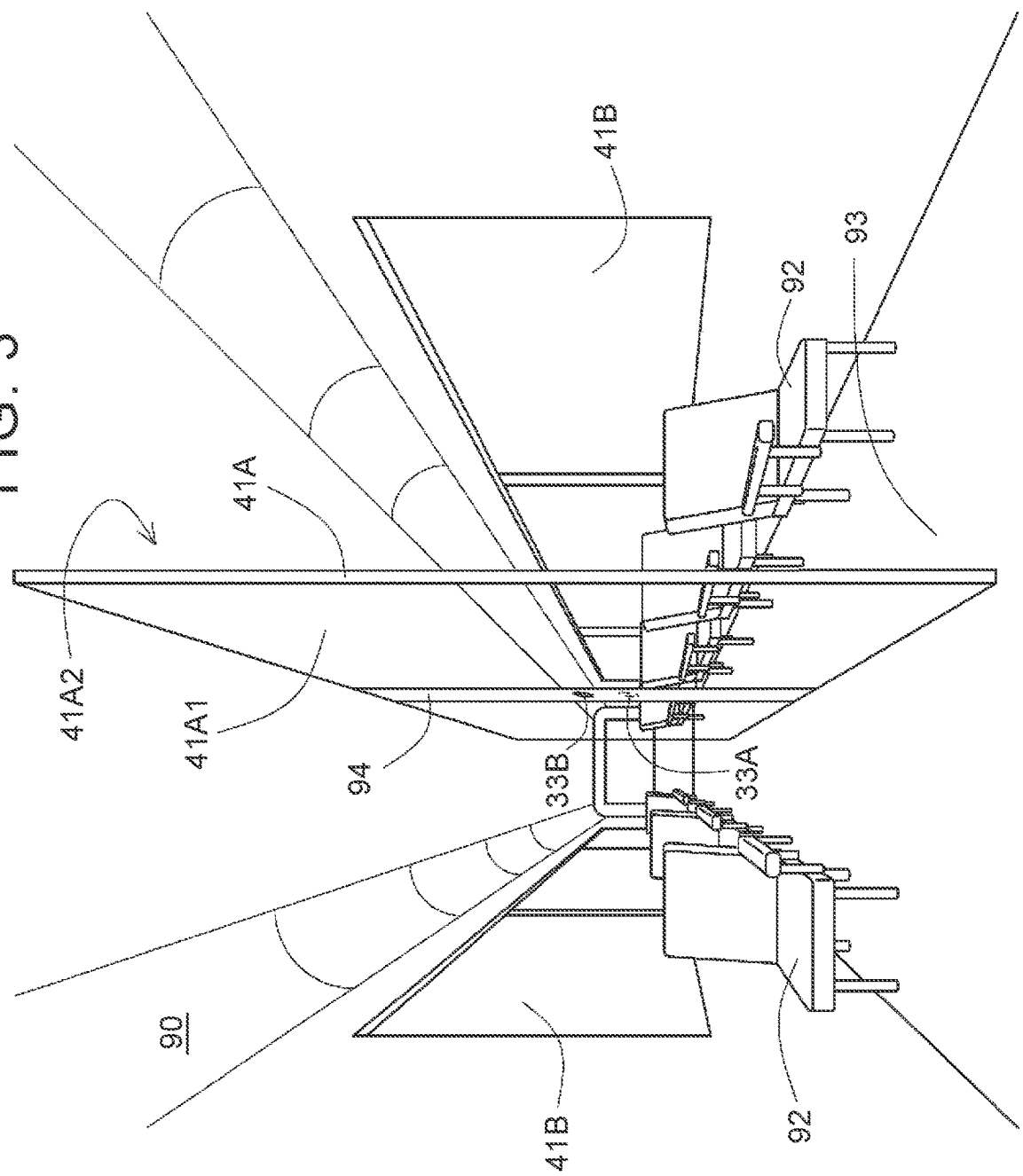
FIG. 3 is a diagram illustrating a state inside a vehicle cabin.

An AR display device 30 according to the present embodiment is mounted on the vehicle 90. FIG. 2 illustrates a perspective view of the vehicle 90. On both side surfaces 91, 91 of the vehicle 90, a vehicle exterior imager 33C of the AR display device 30 for capturing an image of scenery outside the vehicle is provided. FIG. 3 illustrates a state inside a vehicle cabin of the vehicle 90. Inside the vehicle cabin, a plurality of seats 92 is arranged side by side in the longitudinal direction of the vehicle 90. An aisle 93 is provided at the center of the vehicle cabin in the vehicle width direction. The aisle 93 extends in the vehicle longitudinal direction. A row of the seats 92 are provided on each side of the aisle 93 so as to extend in the vehicle longitudinal direction.

A vehicle interior display unit 41A of the AR display device 30 is provided on the aisle 93. The seats 92, specifically, the row of the seats arranged on one side and the row of the seats arranged on the other side are separated by the vehicle interior display unit 41A. In other words, a space in the vehicle cabin is divided into a space on the right side and a space on the left side by the vehicle interior display unit 41A. The vehicle interior display unit 41A is a plate-shaped display device and extends in the vehicle front-rear direction in an upright state. The vehicle interior display unit 41A is installed so as to extend from the floor of the aisle 93 to the ceiling of the vehicle cabin, for example.

Both sides of the vehicle interior display unit 41A are display surfaces. That is, the vehicle interior display unit 41A includes a first display surface 41A1 and a second display surface 41A2. The first display surface 41A1 and the second display surface 41A2 face to the sides of the vehicle cabin (face the vehicle windows) and are positioned back to back (facing to the opposite directions). As will be described later, virtual reality images are displayed on these display surfaces. A frame member 94 extends in the height direction at the central portion of the first display surface 41A1 and the second display surface 41A2 in the vehicle front-rear direction. The frame member 94 is provided with a first vehicle interior imager 33A and a second vehicle interior imager 33B of the AR display device 30.

As shown by broken lines, the first vehicle interior imager 33A is disposed so as to be hidden behind the frame member 94 from the viewpoint of FIG. 3, and captures an image of scenery on the second display surface 41A2 side in the vehicle cabin, that is, scenery on the right side of FIG. 3. This captured image is displayed on the first display surface 41A1. Similarly, the second vehicle interior imager 33B captures an image of scenery on the first display surface 41A1 side in the vehicle cabin, that is, scenery on the left side of the FIG. 3. This captured image is displayed on the second display surface 41A2.

In this way, passengers on the left side of FIG. 3 can see a state inside the vehicle cabin on the right side of FIG. 3 from the first display surface 41A1. Similarly, passengers on the right side of FIG. 3 can see a state inside the vehicle cabin on the left side of FIG. 3 from the second display surface 41A2. As will be described later, on the first display surface 41A1 and the second display surface 41A2, augmented reality images in which people in the images captured by the first vehicle interior imager 33A and the second vehicle interior imager 33B are replaced with virtual objects are displayed.

As the vehicle windows of the vehicle 90, the vehicle window display units 41B of the AR display device 30 are provided. That is, as the vehicle windows, the vehicle 90 is provided with the vehicle window display units 41B that are display devices, instead of glass windows. The vehicle window display units 41B are arranged such that a display surface of each display unit 41B faces the interior of the vehicle cabin.

Images captured by the vehicle exterior imagers 33C (see FIG. 2) of the AR display device 30 are displayed on the vehicle window display units 41B. That is, the scenery from the vehicle windows is displayed in the vehicle cabin via the vehicle exterior imagers 33C and the vehicle window display units 41B. As will be described later, display augmented reality images are displayed on the vehicle window display units 41B, in which people in the images captured by the vehicle exterior imagers 33C are replaced with virtual objects.

Configuration of Server

Figure 4:
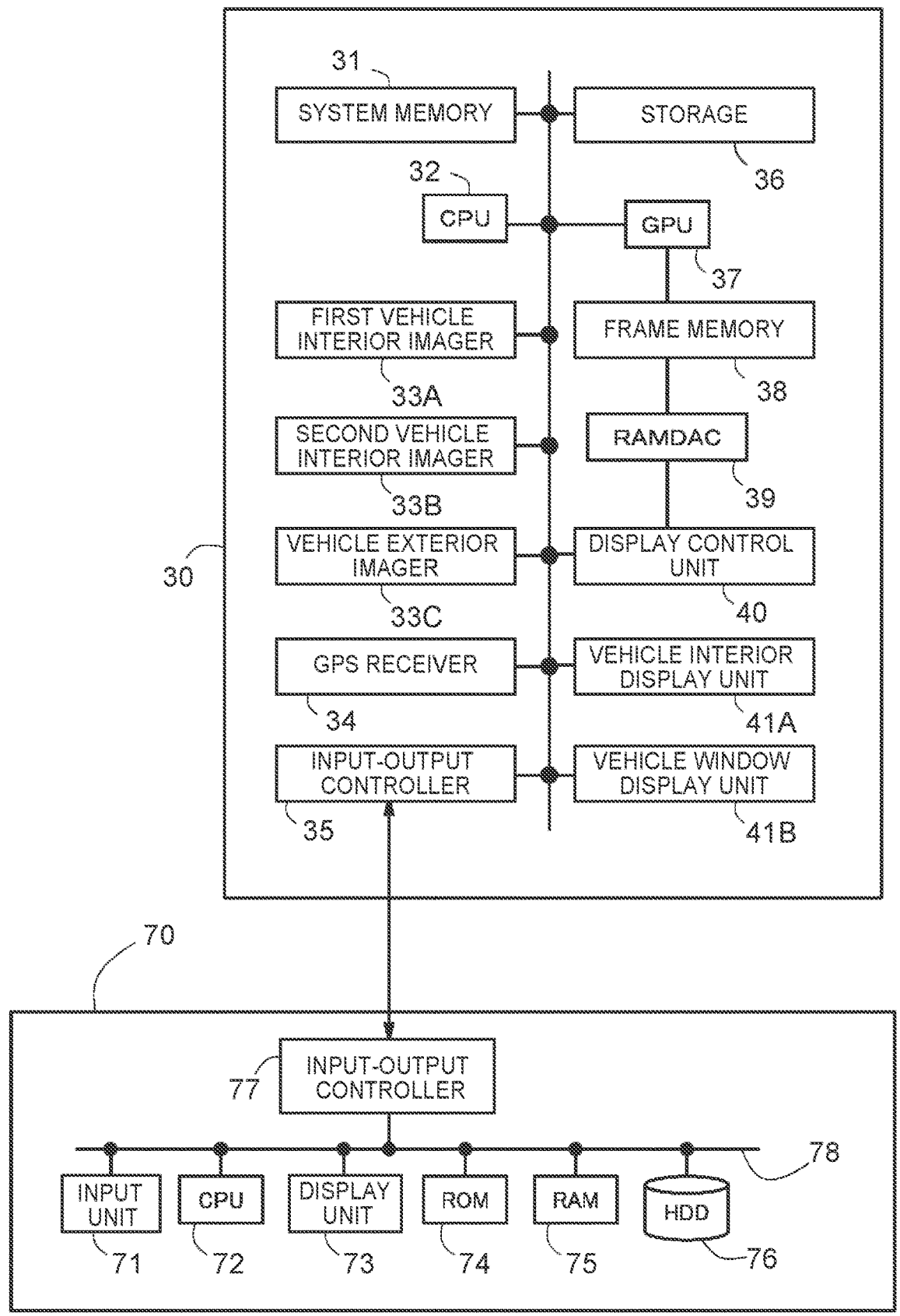
FIG. 4 is a diagram illustrating hardware configurations of a display device and a server of the display system according to the present embodiment.

The display system according to the present embodiment includes the AR display device 30 and the server 70. FIG. 4 illustrates hardware configurations of the AR display device 30 and the server 70. The server 70 is composed of, for example, a computer. The server 70 is installed in, for example, a management building of the complex entertainment facility 10. The server 70 is wirelessly connected to the AR display device 30 by communication means such as a wireless local area network (LAN).

The server 70 includes an input unit 71 such as a keyboard and a mouse, a central processing unit (CPU) 72 serving as an arithmetic device, and a display unit 73 such as a display. The server 70 also includes a read-only memory (ROM) 74, a random access memory (RAM) 75, and a hard disk drive (HDD) 76 as storage devices. Further, the server 70 includes an input-output controller 77 that manages input and output of information. These components are connected to an internal bus 78.

Figure 5:
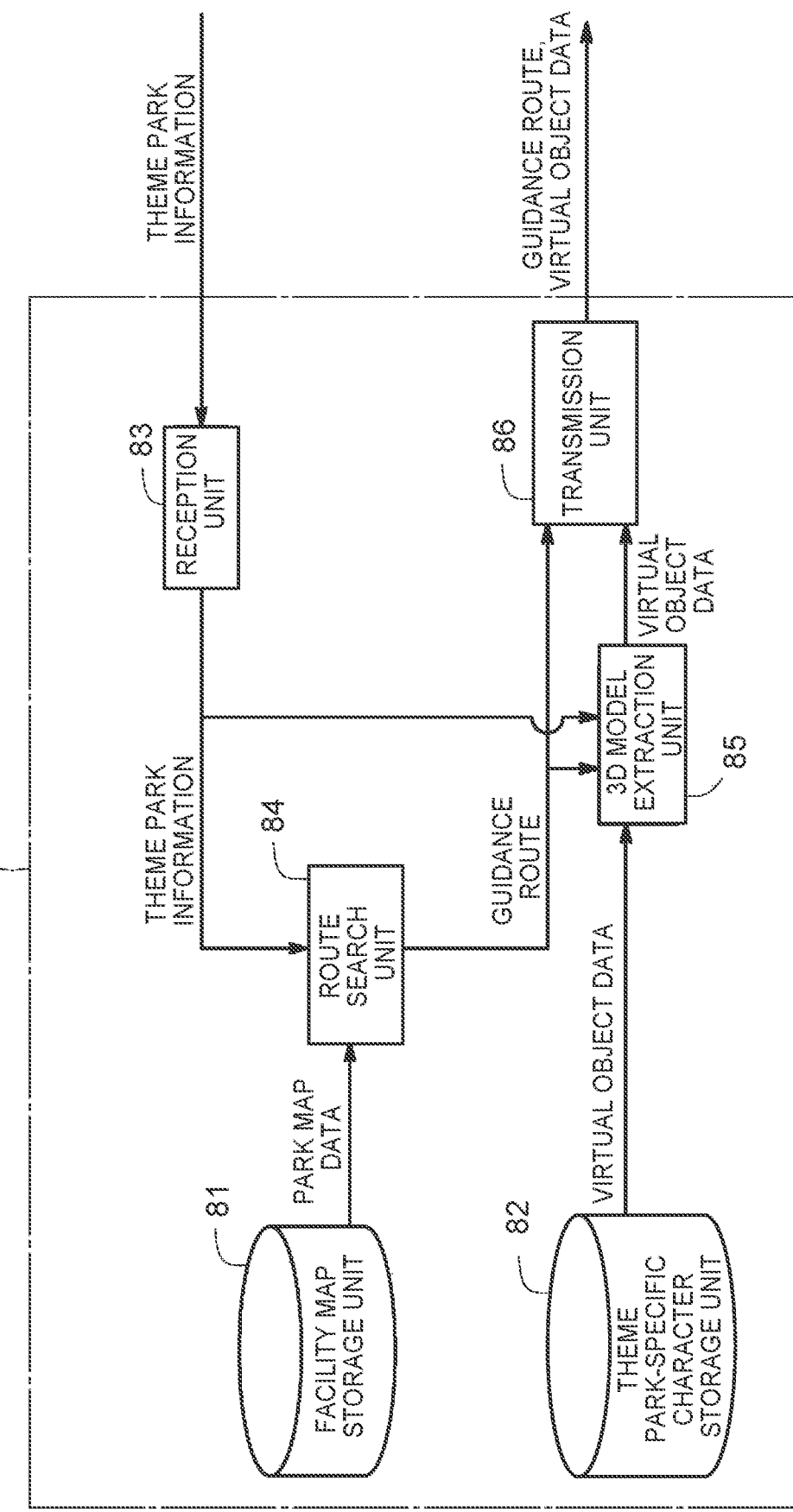
FIG. 5 is a diagram illustrating functional blocks of the server.

FIG. 5 illustrates functional blocks of the server 70. The functional block diagram is configured such that the CPU 72 executes a program stored in, for example, the ROM 74 or the HDD 76 or stored in a non-transitory storage medium such as a digital versatile disc (DVD).

The server 70 includes a reception unit 83 that receives signals from an external device such as the AR display device 30. The server 70 also includes a route search unit 84, a 3D model extraction unit 85, and a transmission unit 86. Further, the server 70 includes a facility map storage unit 81 and a theme park-specific character storage unit 82 as storage units.

The facility map storage unit 81 stores map information of the complex entertainment facility 10. For example, position information of passages and facilities in the complex entertainment facility 10 including the connecting passage 20 is stored.

The theme park-specific character storage unit 82 stores character information set for each of the theme parks 12 to 18. The character information may be, for example, image data of each character, and the image data may be 3D model data. The 3D model data includes, for example, shape data, texture data, and motion data of the character.

The reception unit 83 receives information on a theme park that serves as a departure point for the vehicle 90 (hereinafter, appropriately referred to as departure point park) from the AR display device 30. The information on the theme park includes, for example, textual information of the name of the departure point park. In response to this, the route search unit 84 refers to the facility map storage unit 81 to select a theme park that serves as a destination (hereinafter, appropriately referred to as destination park). For example, a theme park closest to the departure point park or a theme park farthest from the departure point park is the destination theme park. Further, the route search unit 84 creates a route (guidance route) on the connecting passage 20 from the departure point park to the destination park.

Information on the departure point park is transmitted to the 3D model extraction unit 85 in addition to the route search unit 84. Based on the information on the departure point park, the 3D model extraction unit 85 extracts a character set for the departure point park with reference to the theme park-specific character storage unit 82. Further, the 3D model extraction unit 85 sets the extracted character as a virtual object of a departure point group.

The guidance route obtained by the route search unit 84 and the image data of the virtual object of the departure point group extracted by the 3D model extraction unit 85 are transmitted to the AR display device 30 via the transmission unit 86.

Configuration of AR Display Device

With reference to FIG. 1, the AR display device 30 can display an augmented reality image (AR image) to users (passengers) of the vehicle 90. The augmented reality image refers to an image in which an image of a virtual object is superimposed on scenery of the real world. Further, as described above, the AR display device 30 is mounted on the vehicle 90 and can move together with the users (passengers).

FIG. 4 illustrates hardware configurations of the AR display device 30. For example, the AR display device 30 is a video see-through display in which an imager such as a camera captures an image of the scenery of the real world and the captured image is displayed on a display unit. In the example of FIG. 4, the first vehicle interior imager 33A, the second vehicle interior imager 33B, and the vehicle exterior imager 33C correspond to the imager. Further, the vehicle interior display unit 41A and the vehicle window display unit 41B correspond to the display unit.

The AR display device 30 includes a system memory 31, a central processing unit (CPU) 32, the first vehicle interior imager 33A, the second vehicle interior imager 33B, the vehicle exterior imagers 33C, a Global Positioning System (GPS) receiver 34, an input-output controller 35, a storage 36, a graphics processing unit (GPU) 37, a frame memory 38, RAM digital-to-analog converter (RAMDAC) 39, a display control unit 40, the vehicle interior display unit 41A, and the vehicle window display units 41B.

The system memory 31 is a storage device used by an operating system (OS) executed by the CPU 32. The storage 36 is an external storage device, and stores, for example, a program for displaying a virtual reality image (AR image), which will be described later.

The first vehicle interior imager 33A, the second vehicle interior imager 33B, and the vehicle exterior imagers 33C include, for example, an imaging device such as a complementary metal oxide semiconductor (CMOS) imaging device or a charge coupled device (CCD) imaging device. Further, the imagers 33A to 33C may be so-called RGB-D cameras having a function of measuring distances from the imagers 33A to 33C in addition to a function of imaging the real world. As the function of measuring the distance, for example, the imagers 33A to 33C are each provided with a distance measuring mechanism using infrared rays, in addition to the above-mentioned imaging device.

Each of the vehicle interior display unit 41A and the vehicle window display units 41B may be, for example, a liquid crystal display device or an organic EL display device.

The GPU 37 is an arithmetic device for image processing, and is mainly operated when image recognition described later is performed. The frame memory 38 is a storage device that stores images captured by the first vehicle interior imager 33A, the second vehicle interior imager 33B, and the vehicle exterior imagers 33C and subjected to computation by the GPU 37. The RAMDAC 39 converts the image data stored in the frame memory 38 into analog signals for the vehicle interior display unit 41A and the vehicle window display units 41B.

The GPS receiver 34 receives GPS signals that are positioning signals from a GPS satellite 24 (see FIG. 1). The GPS signal includes position coordinate information of latitude, longitude, and altitude. By obtaining the position coordinate information, it is possible to know the current position of the vehicle 90.

Figure 6:
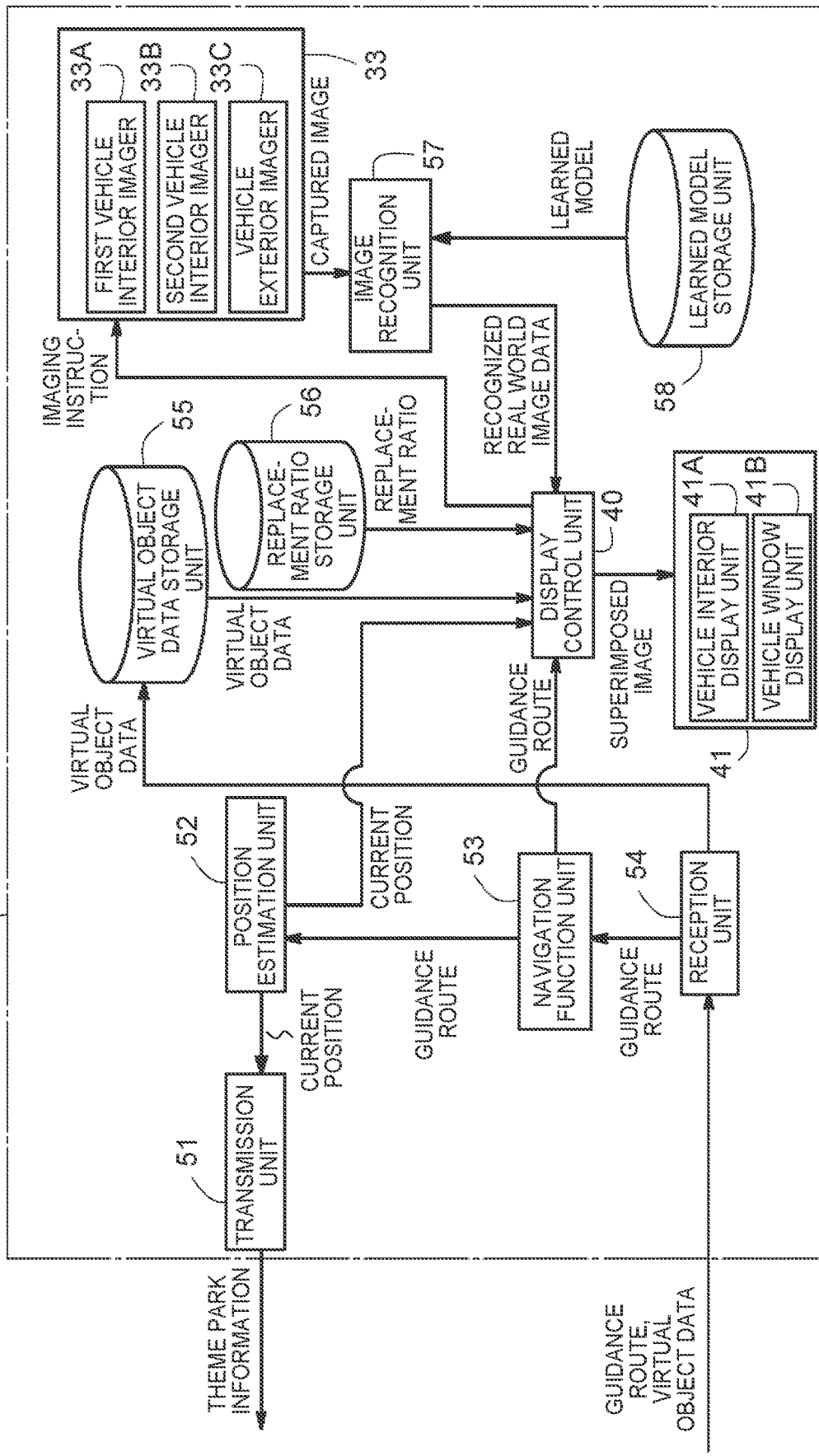
FIG. 6 is a diagram illustrating functional blocks of the display device.

FIG. 6 illustrates a functional block diagram of the AR display device 30. The functional block diagram is configured such that the CPU 32 or the GPU 37 executes a position estimation program stored in, for example, the system memory 31 or the storage 36, or stored in a non-transitory storage medium such as a DVD or a hard disk of a computer.

FIG. 6 shows a part of the hardware configuration illustrated in FIG. 4 and the functional blocks in a combined state. FIG. 6 illustrates, as the hardware configuration, the first vehicle interior imager 33A, the second vehicle interior imager 33B, the vehicle exterior imager 33C, the display control unit 40, the vehicle interior display unit 41A, and the vehicle window display unit 41B.

Further, as the functional blocks, the AR display device 30 includes a transmission unit 51, a position estimation unit 52, a navigation function unit 53, a reception unit 54, an image recognition unit 57, a virtual object data storage unit 55, a replacement ratio storage unit 56, and a learned model storage unit 58. These functional blocks are composed of the CPU 32, the system memory 31, the storage 36, the GPU 37, the frame memory 38, and the like.

The virtual object data storage unit 55 stores image data (3D model data) of the virtual object of the character of the departure point group extracted by the 3D model extraction unit 85 (see FIG. 5) of the server 70.

Figure 7:
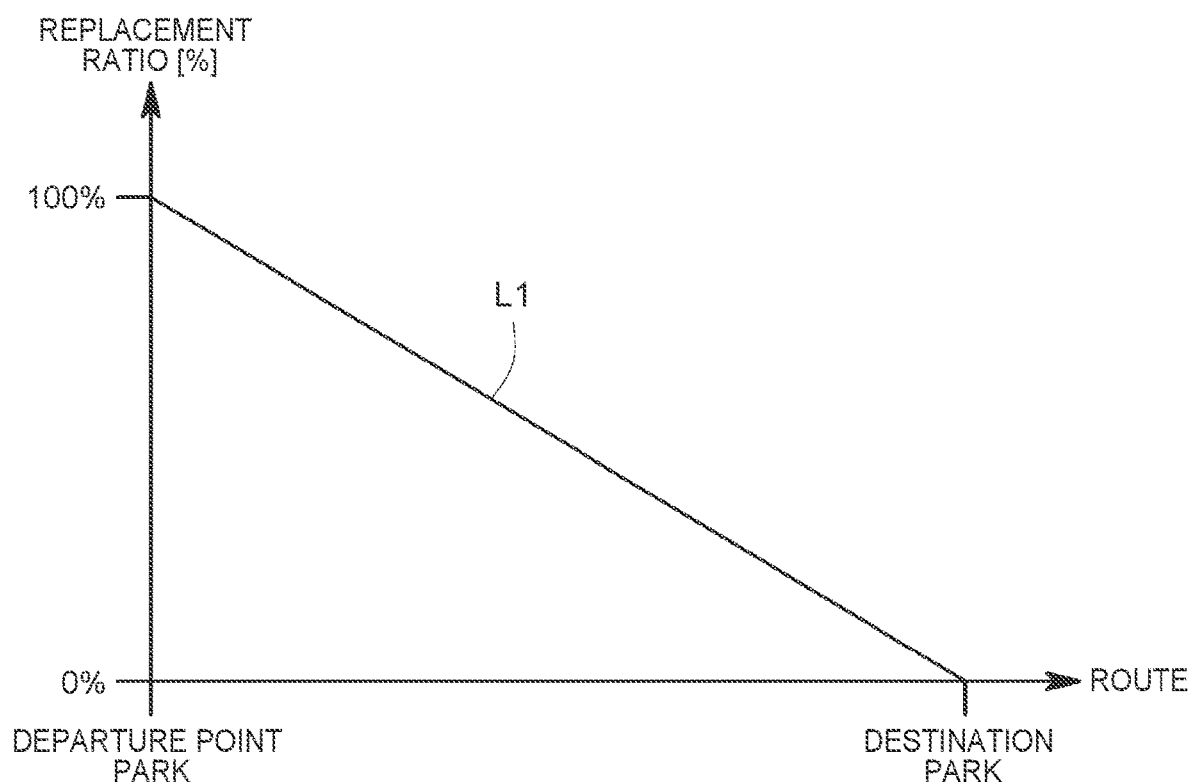
FIG. 7 is a diagram illustrating a replacement ratio of virtual objects of a departure point group.

The replacement ratio storage unit 56 stores a replacement ratio map illustrated in FIG. 7. The replacement ratio map is a graph in which the horizontal axis represents the route and the vertical axis represents the replacement ratio. On this graph, a characteristic line L1 showing the replacement ratio of the virtual objects of the departure point group is plotted. The departure point group refers to a group of virtual objects (character group) set for the departure point park.

The replacement ratio indicates the ratio of the image areas of people to be replaced with the virtual objects to the image areas of all the people recognized by the image recognition unit 57. This replacement ratio is set to 100%, for example, when the vehicle 90 is in the departure point park. That is, in the departure point park, the image areas of all the people recognized by the image recognition unit 57 are replaced with the virtual objects of the departure point group.

The replacement ratio decreases as the distance from the departure point park increases. Further, in the destination park, the image area of any person recognized by the image recognition unit 57 is not replaced by the virtual object. That is, the replacement ratio is 0%. By setting such a replacement ratio, it is possible to produce an effect that the number of characters of the theme park that see off the passengers decreases as the distance from the departure point park increases.

The learned model storage unit 58 stores, for example, a neural network for image recognition that has been trained by an external server or the like. For example, image data of the inside and outside of the vehicle cabin, in which each object, especially each person, in the image has been segmented and annotated, is prepared as training data. Using this training data, a multi-level neural network is formed that has machine-learned by supervised learning, and is stored in the learned model storage unit 58. This neural network may be, for example, a convolutional neural network (CNN).

The image recognition unit 57 receives the image data captured by the first vehicle interior imager 33A, the second vehicle interior imager 33B, and the vehicle exterior imagers 33C, and performs image recognition. The image recognition includes recognition of objects in the captured image and estimation of the distance between each object and the AR display device 30. In such image recognition, the captured image data includes, for example, a color image data obtained by imaging the scenery of the real world as well as distance data of each object in the color image data from each of the imagers 33A to 33C, as described above.

The image recognition unit 57 uses the learned neural network for image recognition stored in the learned model storage unit 58 to determine whether the images captured by the first vehicle interior imager 33A, the second vehicle interior imager 33B, and the vehicle exterior imagers 33C contain a person. The image area of the person in the captured image that is recognized by the image recognition unit 57 is distinguished (segmented) from other image areas. Such a processed captured image is transmitted to the display control unit 40.

The display control unit 40 receives the processed (person-recognized) captured image data from the image recognition unit 57, and also acquires the current position information from the position estimation unit 52. The display control unit 40 also acquires the guidance route information to the destination park, from the navigation function unit 53. Further, the display control unit 40 acquires the image data (3D model data) of the virtual object data of the departure point group from the virtual object data storage unit 55, and acquires the replacement ratio map from the replacement ratio storage unit 56.

The display control unit 40 acquires the replacement ratio in the replacement ratio map that corresponds to the current position, based on the current position provided by the position estimation unit 52 and the guidance route information provided by the navigation function unit 53. Further, the display control unit 40 performs replacement between the image area of the people and the virtual objects based on the acquired replacement ratio. The image after the replacement, that is, the augmented reality image is displayed on the vehicle interior display unit 41A and the vehicle window display units 41B.

Augmented Reality Image Display Process in which Virtual Objects of Departure Point Group are Displayed FIG. 8 illustrates a state of augmented reality image display by the display system according to the present embodiment. In FIG. 8, a virtual reality image in which a virtual object image 102 is superimposed on the captured image of the real world is displayed on the first display surface 41A1 and the vehicle window display unit 41B. Although the virtual object image 102 is shown as a flat contour diagram for the sake of clarity, it is not limited to this form. The virtual object image 102 may be a 3D image.

Figure 9:
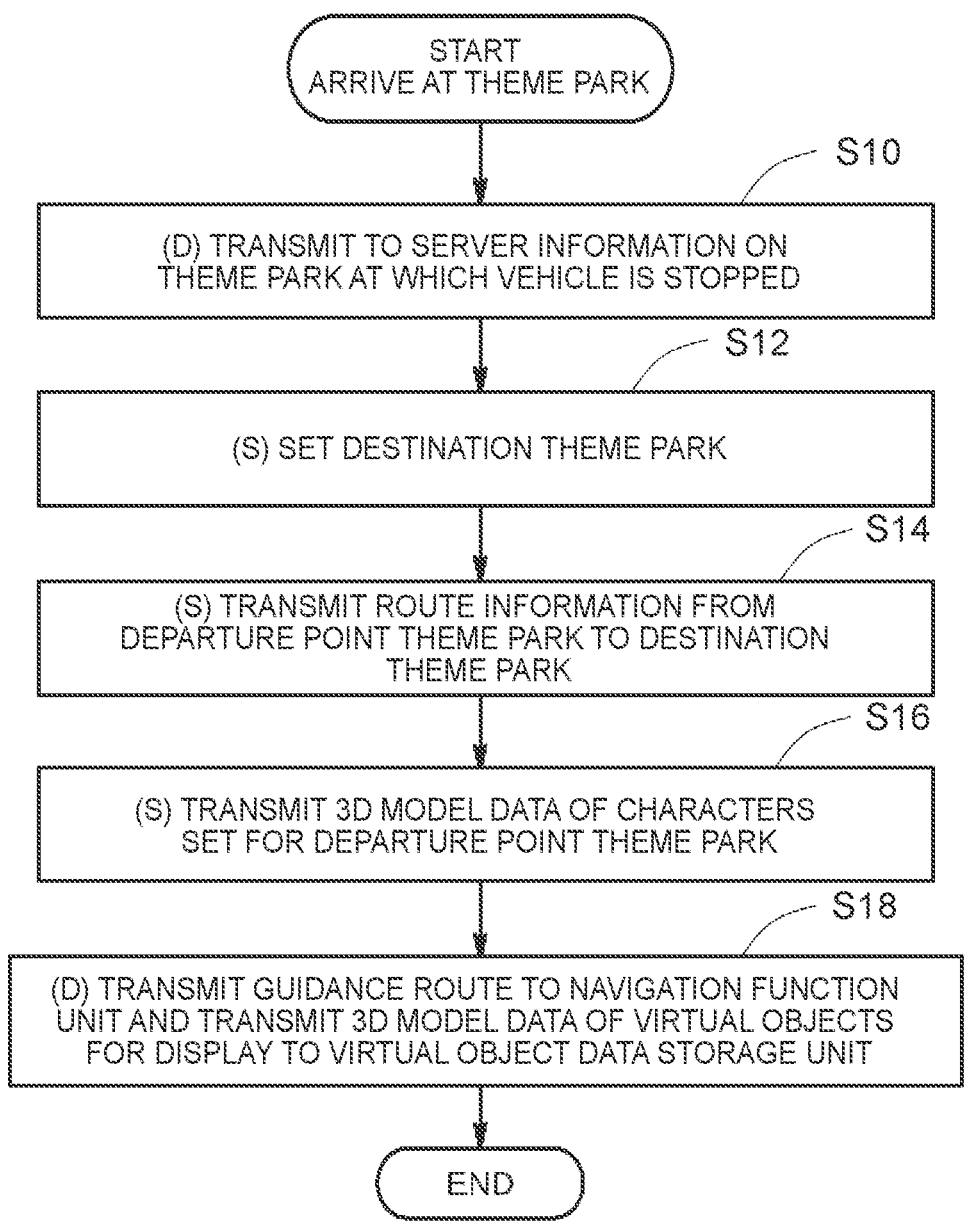
FIG. 9 is a diagram illustrating an initial setting flow of augmented reality image display.

FIG. 9 illustrates a flowchart of especially an initial setting, in the augmented reality image display process by the display system according to the present embodiment. In the flowchart, the processes mainly executed by the server 70 are indicated by (S), and the processes mainly executed by the AR display device 30 of the vehicle 90 are indicated by (D).

The flow illustrated in FIG. 9 is activated when the vehicle 90 arrives at any of the theme parks 12 to 18, in other words, when any of the theme parks 12 to 18 serves as the departure point. For example, with reference to FIG. 1, the flow is activated when the vehicle 90 stops at a stop 95 in front of each of the theme parks 12 to 18.

In the AR display device 30 of the vehicle 90, the position estimation unit 52 (see FIG. 6) estimates the current position, and the transmission unit 51 transmits to the server 70 the information on the theme park, out of the theme parks 12 to 18, at which the vehicle 90 is stopped, that is, the information on the departure point theme park (S10). The information on the departure point theme park includes, for example, textual information of the departure point theme park.

When the reception unit 83 (see FIG. 5) of the server 70 receives the information on the departure point theme park, the information is transmitted to the route search unit 84 and the 3D model extraction unit 85. The route search unit 84 sets the destination park with reference to the park map data stored in the facility map storage unit 81 (S12). The destination theme park may be a theme park, out of the theme parks 12 to 18, that is closest to the departure point theme park, or a theme park, out of the theme parks 12 to 18, that is farthest from the departure point theme park, for example.

Next, the route search unit 84 creates a guidance route that is a route on the connecting passage 20 (see FIG. 1) from the departure point theme park to the destination theme park. The created guidance route is transmitted to the AR display device 30 via the transmission unit 86 (S14).

On the other hand, the 3D model extraction unit 85 that has received the information on the departure point theme park sets the character set for the departure point park as a virtual object for display with reference to the theme park-specific character storage unit 82. When there is a plurality of characters set in advance for the departure point park, for example, all the characters are selected as characters (virtual objects) of the departure point group. The 3D model data of the virtual objects representing the characters of the departure point group set as the virtual objects for display is transmitted to the AR display device 30 via the transmission unit 86 (S16).

The reception unit 54 of the AR display device 30 that has received the guidance route information and the 3D model data of the virtual objects for display transmits the guidance route information to the navigation function unit 53. The reception unit 54 also transmits the 3D model data of the virtual objects for display to the virtual object data storage unit 55 (S18).

Figure 10:
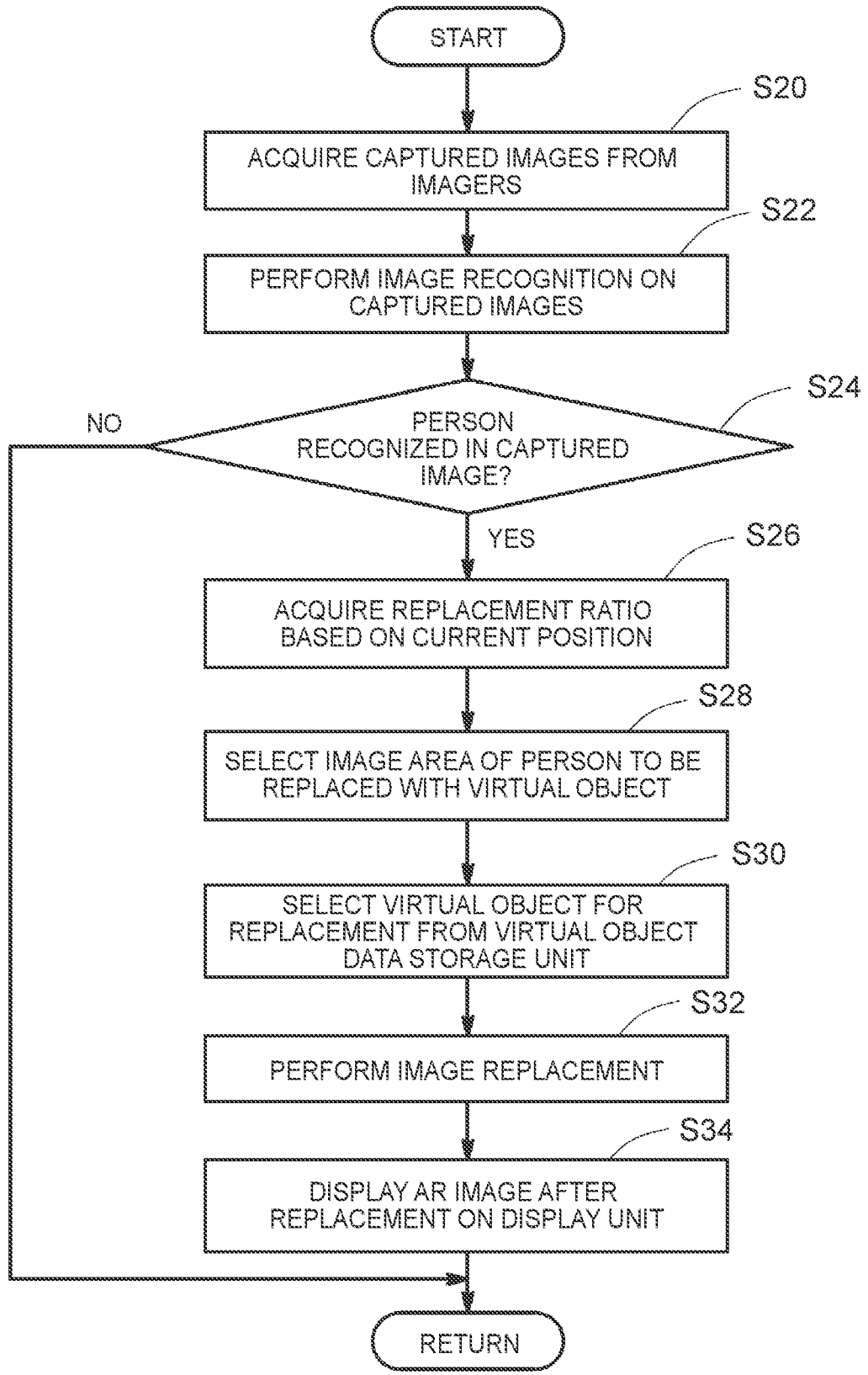
FIG. 10 is a diagram illustrating an augmented reality image display flow.

FIG. 10 illustrates a flowchart of the augmented reality image display process after the above initial setting. In the flowchart, all processes (steps) are executed by the AR display device 30. Note that the flowchart is repeatedly executed from the departure point park to the destination park. The image recognition unit 57 acquires the captured images from the first vehicle interior imager 33A, the second vehicle interior imager 33B, and the vehicle exterior imagers 33C (S20).

The image recognition unit 57 also performs image recognition on the captured images (S22). In this image recognition, the image recognition unit 57 recognizes a person in the captured image (S24). For example, the learned model storage unit 58 stores teacher data of an image of a seated person and an image of a walking person, and the neural network trained with the teacher data is used for the image recognition by the image recognition unit 57.

When it is recognized that the captured image does not include a person, the flow of FIG. 10 returns to the starting point, and the captured images of the real world are displayed on the vehicle interior display unit 41A and the vehicle window display units 41B. On the other hand, when it is recognized that the captured image includes a person, the image recognition unit 57 executes segmentation for segmenting the image area of the person in the captured image, and performs annotation for annotating the image area as a person. The captured image that has been subjected to the image recognition process is transmitted to the display control unit 40.

The display control unit 40 acquires the replacement ratio map (see FIG. 7) from the replacement ratio storage unit 56. The display control unit 40 also acquires the guidance route information from the navigation function unit 53 and the current position of the vehicle 90 from the position estimation unit 52.

Further, the display control unit 40 obtains the replacement ratio based on the current position. For example, the display control unit 40 obtains the ratio of the distance traveled from the departure point park to the current position with respect to the distance from the departure point park to the destination park, and acquires the replacement ratio corresponding to that ratio from the replacement ratio map (S26).

Next, the display control unit 40 selects an image area to be replaced with the image of the virtual object from the image areas in which people are recognized by the image recognition unit 57, based on the replacement ratio (S28). The display control unit 40 also selects a virtual object for replacement from the departure point group (S30). When there is a plurality of types of virtual objects in the departure point group stored in the virtual object data storage unit 55, the display control unit 40 selects, for example, a character of the virtual object, as appropriate.

Alternatively, the character of the virtual object for the replacement may be selected in accordance with the time of a day. For example, the display control unit 40 checks the current time and selects a character of a diurnal animal as the virtual object for replacement during the daytime. By selecting a character in accordance with the time of the day as describe above, it is possible to produce an effect that matches the actual ecology of the animals.

Further, the display control unit 40 replaces the selected image area of the person with the virtual object image of the character of the departure point park (S32).

Figure 11:
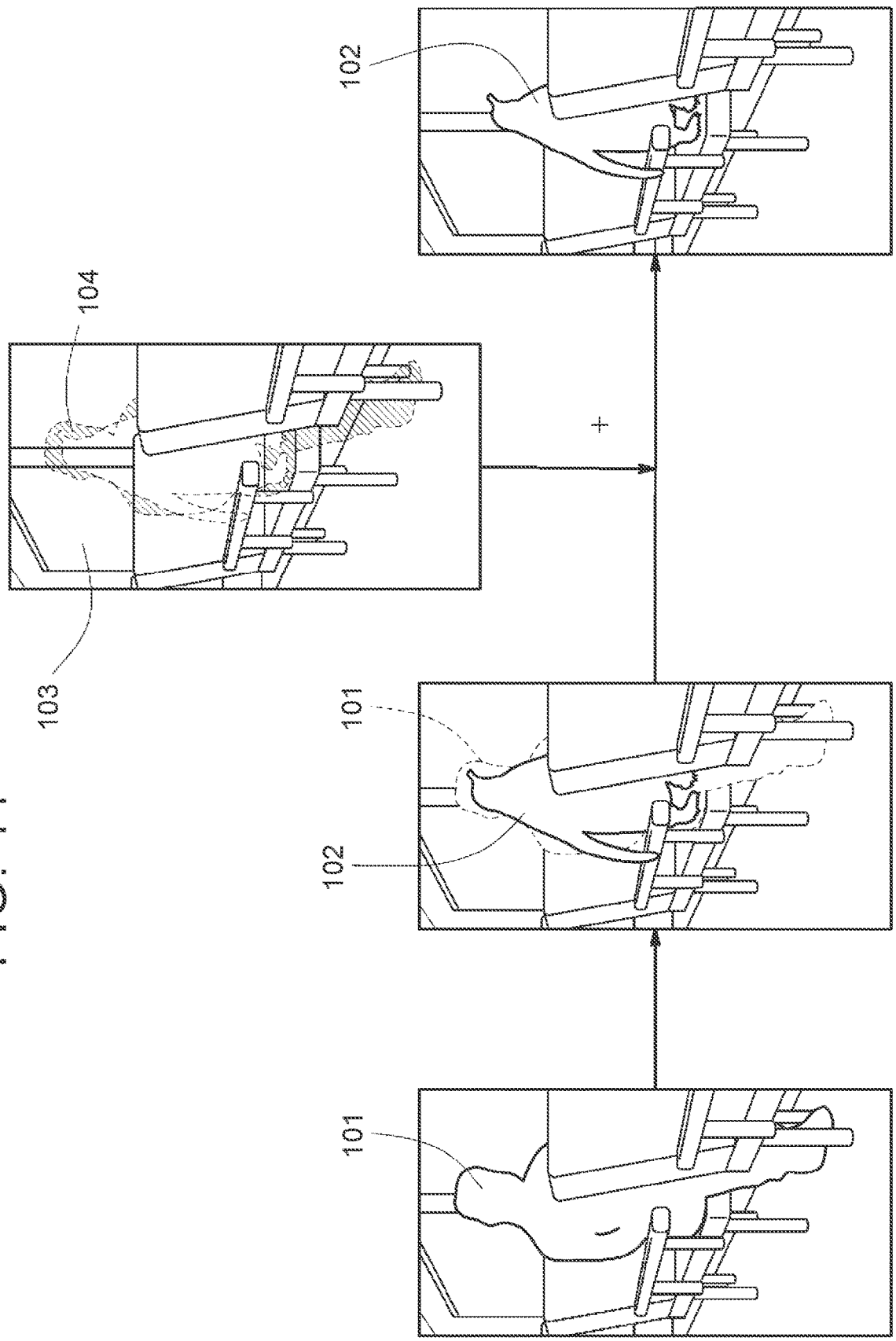
FIG. 11 is a diagram illustrating steps of replacing an image area of a person with a virtual object image.

FIG. 11 illustrates the image replacement process. A passenger image area 101 is deleted from the captured image, and the virtual object image 102 is inserted into the deleted area. At this time, a so-called concealment process may be performed, including hiding a part of the handrail of the seat with the right hand of the virtual object (penguin), for example.

The passenger image area 101 and the virtual object image 102 do not have the same shape and area. Therefore, even when the virtual object image is inserted into the captured image, a missing portion occurs in the image. Thus, the display control unit 40 extracts a background image 104 (indicated by hatching) that fills the missing portion from a basic image 103 and inserts the background image 104 into the captured image being processed. The basic image 103 is, for example, a captured image of the inside of the vehicle cabin with no passengers or a captured image of the connecting passage 20, and is stored in a storage unit of an AR display device 30.

The display control unit 40 causes the vehicle interior display unit 41A and the vehicle window display units 41B to display the augmented reality image in which the person is replaced with the character of the departure point park that is formed as described above (S34). In this way, with the display system according to the present embodiment, the character set for the theme park at the departure point is displayed in the virtual reality image. Therefore, it is possible to provide services based on the concept of the theme park even after leaving the theme park.

Augmented Reality Image Display Process in which Virtual Objects of Departure Point Group and Destination Group are Displayed In the augmented reality image display process described above, the virtual objects of the departure point group are superimposed on the image of the real world. However, in addition to this, virtual objects of a group of virtual objects set for the destination park (hereinafter, referred to as destination group as appropriate) may be superimposed on the image of the real world.

Figure 12:
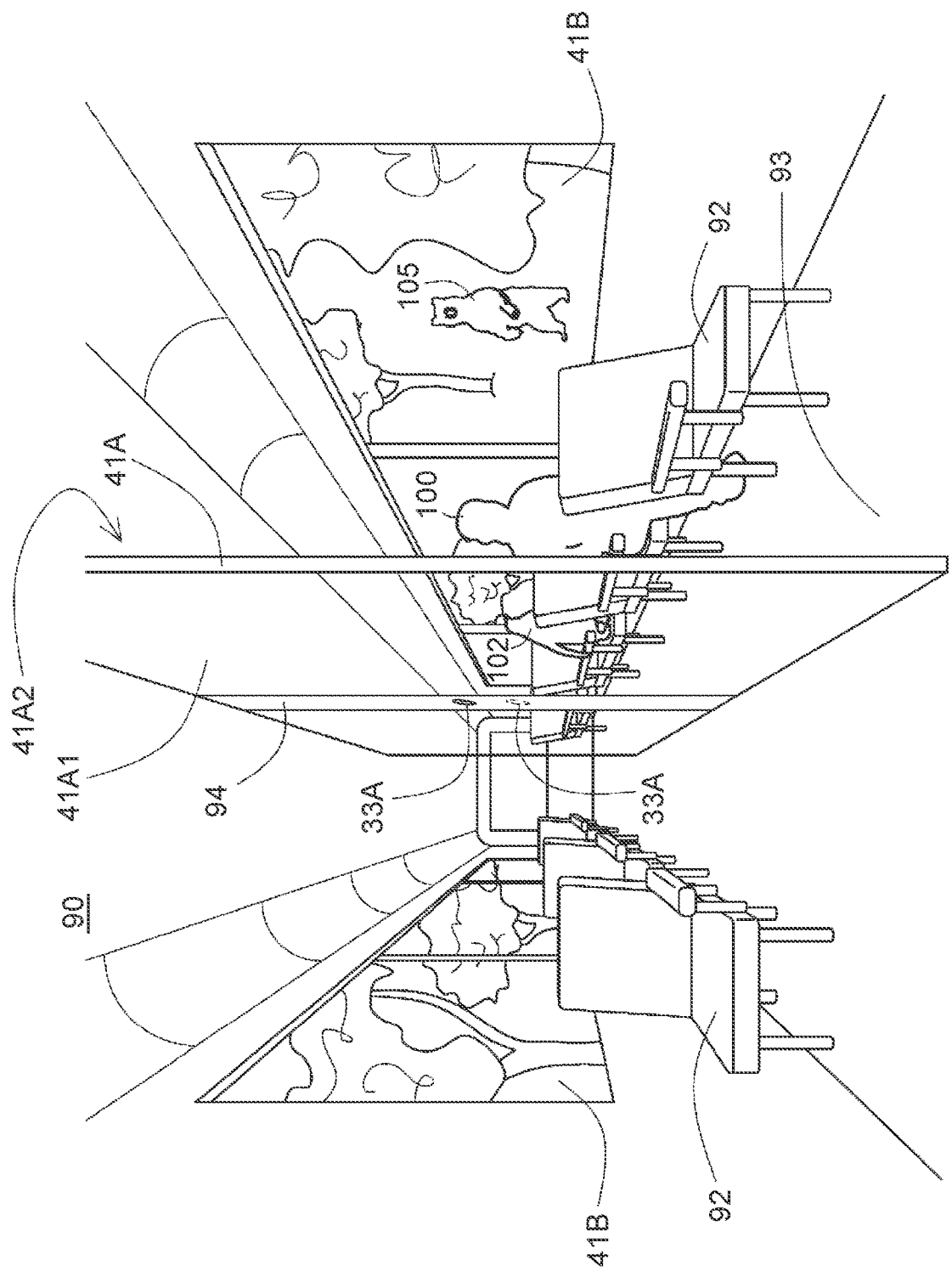
FIG. 12 is a diagram illustrating an example in which an augmented reality image in which an image of a virtual object of a destination group is superimposed is displayed on a display unit provided as a vehicle window.

For example, FIG. 12 shows a display example of an augmented reality image when the departure point park is set to an aquarium and the destination park is set to a zoo. In FIG. 12, the virtual object image 102 (penguin) of the departure point group is displayed on the first display surface 41A1 of the vehicle interior display unit 41A, whereas the virtual object image 105 (bear) of the destination group is displayed on the vehicle window display unit 41B. The image data of the virtual objects of the departure point group and the image data of the virtual objects of the destination group are stored in the theme park-specific character storage unit 82 of the server 70.

Figure 13:
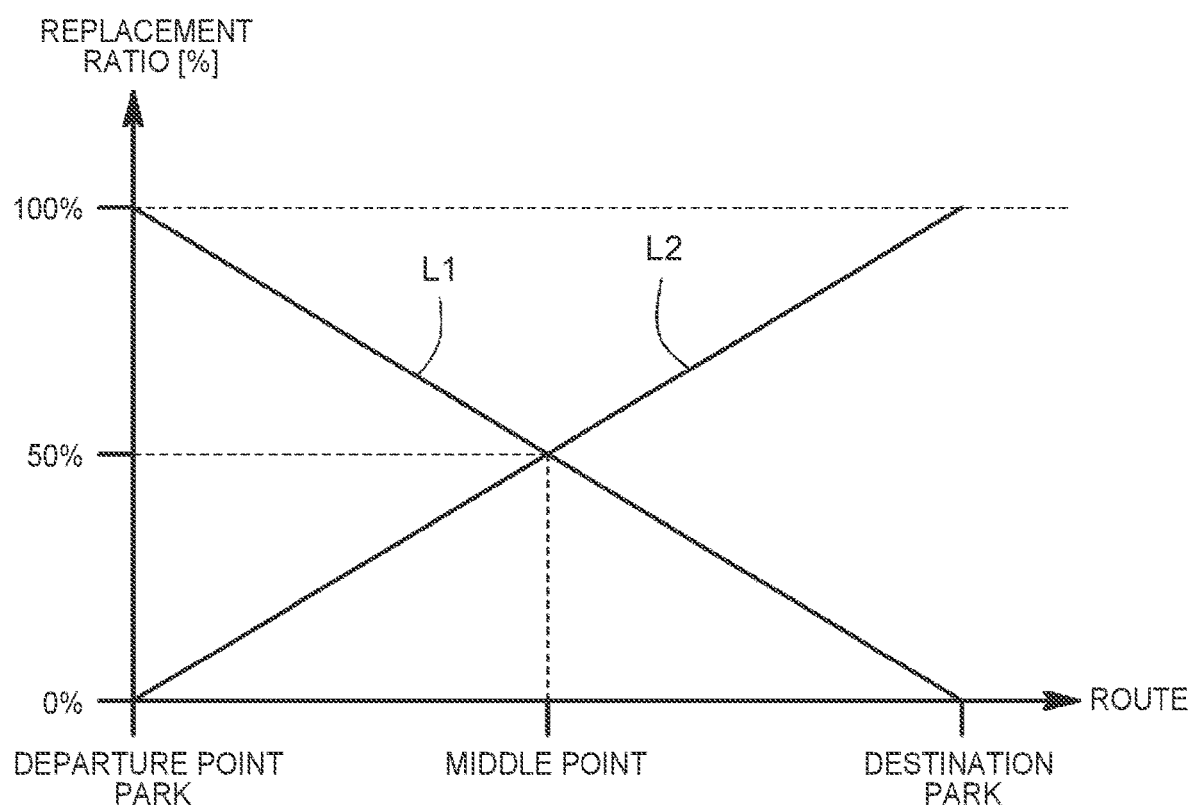
FIG. 13 is a diagram illustrating replacement ratios of virtual objects of the departure point group and the destination group.

For the display of such virtual objects, the replacement ratio storage unit 56 stores a replacement ratio map as illustrated in FIG. 13. In this map, in addition to the characteristic line L1 showing the replacement ratio of the virtual objects of the departure point group shown in FIG. 7, a characteristic line L2 showing the replacement ratio of the virtual objects of the destination group is plotted. For example, the replacement ratios obtained by the characteristic lines L1 and L2 may be set such that the total sum is 100% at any point.

On the characteristic line L2, for example, the replacement ratio at the departure point park is set to 0%, and the replacement ratio at the destination park is set to 100%. Between these, the replacement ratio increases linearly toward the destination park.

According to the characteristic line L2, the ratio (replacement ratio) of the image areas of people to be replaced with the virtual objects of the destination group with respect to the image areas of all the people recognized by the image recognition unit 57 increases toward the destination park. By setting such a replacement ratio, it is possible to produce an effect that the number of characters of the theme park that welcome the passengers increases as the distance from the destination park decreases.

Figure 14:
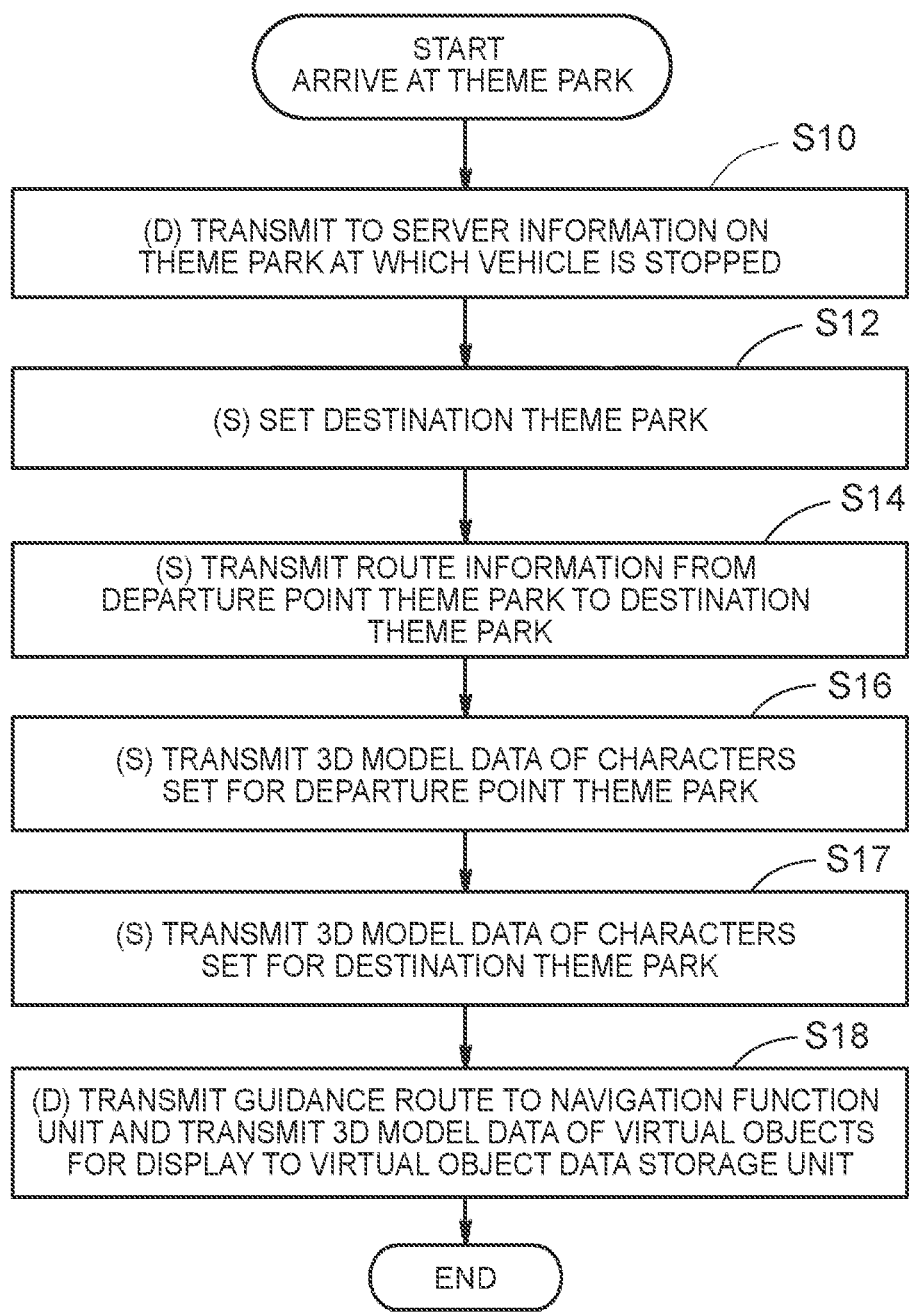
FIG. 14 is a diagram illustrating an initial setting flow for displaying images of the virtual objects of the departure point group and the destination group in the augmented reality image.

FIG. 14 illustrates a flowchart of especially an initial setting, in the augmented reality image display process, when the replacement ratio map shown in FIG. 13 is used. In the following, since the steps with the same reference signs as those of the steps shown in FIG. 9 have the same content, the description of such steps will be omitted as appropriate.

In this flow, in the server 70 (see FIG. 5), the route search unit 84 transmits the guidance route information to the 3D model extraction unit 85 in addition to the transmission unit 86. The 3D model extraction unit 85 selects the virtual object of the departure point group (S16) and selects the virtual object of the destination group (S17). The image data of the selected virtual objects of the departure point group and the destination group is transmitted from the transmission unit 86 to the reception unit 54 of the AR display device 30 and is stored in the virtual object data storage unit 55.

Figure 15:
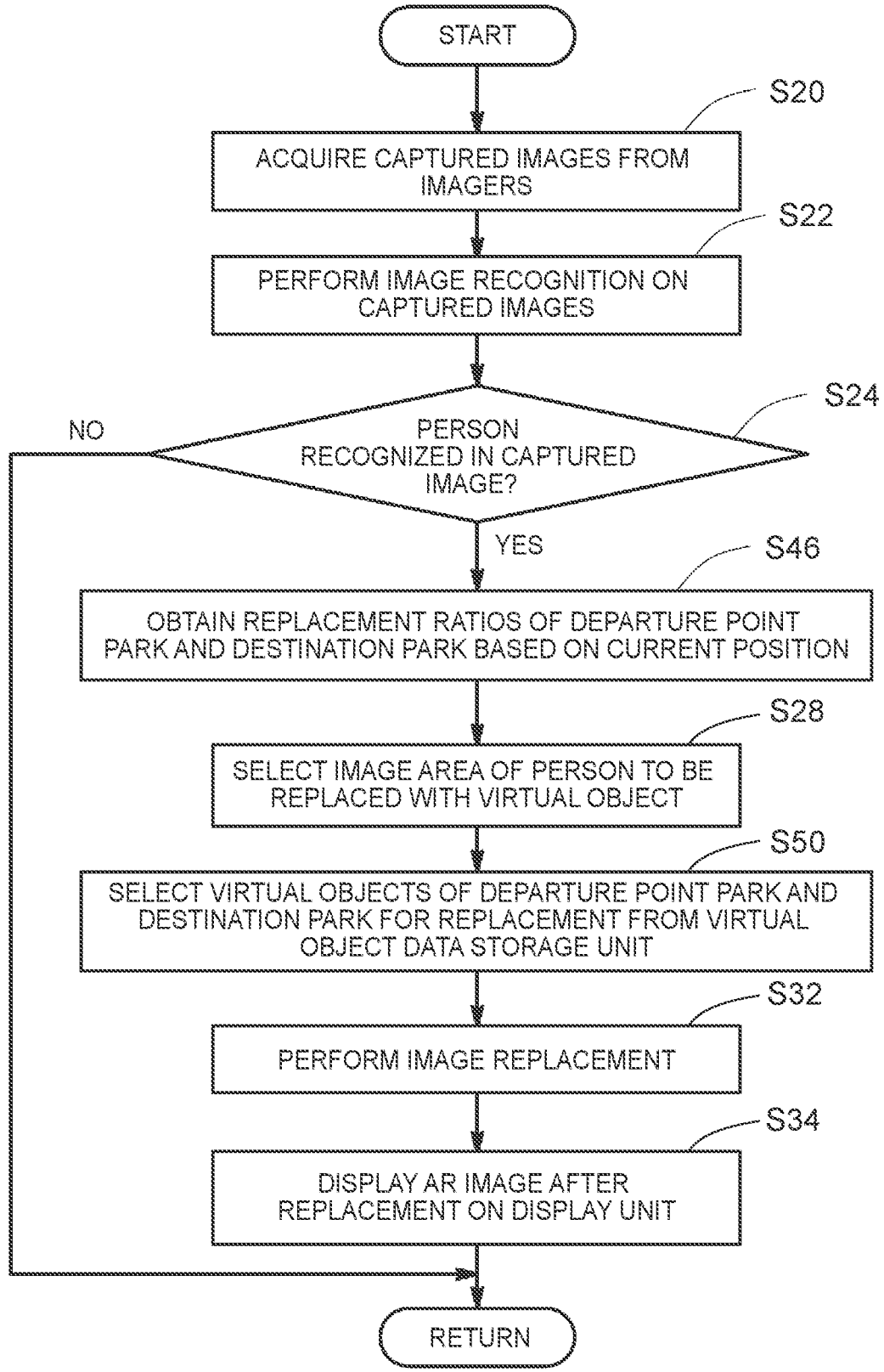
FIG. 15 is a diagram illustrating an augmented reality image display flow for displaying the images of the virtual objects of the departure point group and the destination group in the augmented reality image.

FIG. 15 illustrates a flowchart of the augmented reality image display process after the above initial setting. In the following, since the steps with the same reference signs as those of the steps shown in FIG. 10 have the same content, the description of such steps will be omitted as appropriate.

In step S24, when the image recognition unit 57 (see FIG. 6) recognizes people (S24) while the first vehicle interior imager 33A, the second vehicle interior imager 33B, and the vehicle exterior imagers 33C are capturing images, the display control unit 40 obtains the replacement ratios of the departure point group and the destination group based on the current position (S46). Further, in step S28, when the image areas to be replaced with the images of the virtual objects are selected based on the respective replacement ratios, the display control unit 40 selects the virtual objects for replacement from the departure point group and the destination group (S50). As described above, when the departure point group and the destination group each include a plurality of types of virtual objects stored in the virtual object data storage unit 55, the display control unit 40 may select the virtual objects (characters) in accordance with the time of the day.

Example in which Display System is Composed of Single Display Device

In the above embodiment, the display system is composed of the AR display device 30 and the server 70, but the display system disclosed in the present specification is not limited to this embodiment. For example, the function of the server 70 may be implemented in the AR display device 30.

In the above embodiment, the main role of the server 70 is determining a destination park based on the departure point park to create a guidance route and extracting a group of virtual objects based on the departure point park and the destination park.

Figure 16:
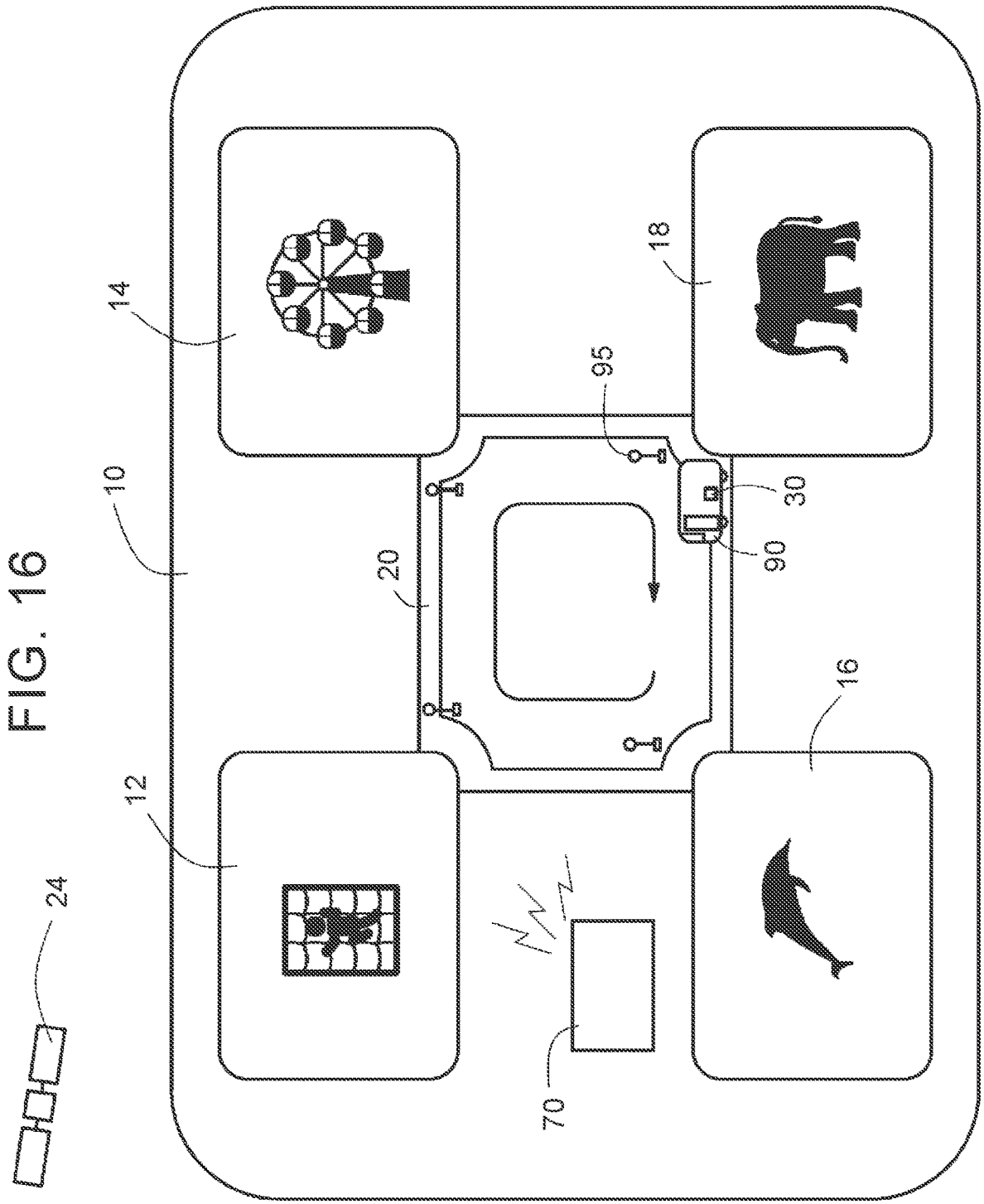
FIG. 16 is a diagram illustrating an example in which a vehicle performs circulation traveling on the connecting passage.

Here, for example, when the operation of the vehicle 90 is a circulation operation as illustrated in FIG. 16 and the departure point and the destination are determined in advance (set as fixed values), the server 70 need not to select the destination. Thus, in the virtual reality image display process, especially in the initial settings of FIGS. 9 and 14, the AR display device 30 may execute the entire process, instead of causing the server 70 to execute part of the processes (steps).

FIG. 17 illustrates functional blocks of the AR display device 30 that can display augmented reality images by itself (without the server 70). In FIG. 17, the theme park-specific character storage unit 82 and the facility map storage unit 81 that are provided in the server 70 in FIGS. 5 and 6 are provided in the AR display device 30. With this, in the initial setting flows as in FIGS. 9 and 14, all the processes (steps) can be executed by the AR display device 30. Further, after the initial settings, in the augmented reality image display flows illustrated in FIGS. 10 and 15, all the processes (steps) can be executed by the AR display device 30 alone. In this case, the function of the 3D model extraction unit 85 (FIG. 5) of the server 70 can be implemented by the display control unit 40 of the AR display device 30.

What is claimed is:

1. A display system comprising:
a display device that is movable with a user and that includes a display unit and a display control unit configured to display, on the display unit, an augmented reality image in which an image of a virtual object is superimposed on scenery of a real world; and
a server wirelessly connected to the display device, wherein:
when a facility configured based on a specific theme is set as a departure point, the display device transmits facility information of the departure point to the server; and
the server includes
a storage unit that stores information on a character set for the facility of the departure point, and
a first processor that is configured to transmit, to the display device, image data of the character set for the facility of the departure point, with the character being set as a virtual object of the departure point, wherein
the display device is mounted on a vehicle;
the display unit is disposed to separate a plurality of seats in a vehicle cabin, and includes a first display surface and a second display surface, the first display surface and the second display surface being positioned back to back and each facing to a side of the vehicle cabin;
the display device includes
a first imager that is configured to capture an image of the vehicle cabin on the second display surface side, the image captured by the first imager being displayed on the first display surface,
a second imager that is configured to capture an image of the vehicle cabin on the first display surface side, the image captured by the second imager being displayed on the second display surface, and
a second processor that is configured to perform image recognition on the image captured by each of the first imager and the second imager; and
the display control unit is configured to, when the second processor recognizes a person in the captured image, generate the captured image in which an image region of the recognized person is replaced with the virtual object of the departure point to display the captured image on each of the first display surface and the second display surface.

2. The display system according to claim 1, wherein the display control unit is configured to decrease a ratio of an image area of the person that is replaced with the virtual object of the departure point with respect to image areas of all recognized people, as a distance from the facility of the departure point increases.

3. The display system according to claim 2, wherein:
the storage unit stores information on a character set for a facility serving as a destination;
the first processor is configured to transmit, to the display device, image data of the character set for the facility of the destination, with the character being set as a virtual object of the destination; and
the display control unit is configured to increase the ratio of an image area of a person that is replaced with the virtual object of the destination with respect to image areas of all recognized people, as a distance from the facility of the destination decreases.

4. The display system according to claim 3, wherein:
a plurality of characters is set in the storage unit as virtual objects of the departure point and virtual objects of the destination; and
the display control unit is configured to select the characters of the virtual objects for replacement in accordance with time of a day.

5. A display device mounted on a vehicle, the display device comprising:
a storage unit that stores information on a character set for a facility configured based on a specific theme;
a processor that is configured to extract a character set for a facility that is set as a departure point, as a virtual object of the departure point;
a display unit including a display surface facing an interior of a vehicle cabin; and a display control unit that is configured to display, on the display unit, an augmented reality image in which an image of the virtual object of the departure point is superimposed on scenery of a real world, wherein the display unit is disposed to separate a plurality of seats in a vehicle cabin, and includes a first display surface and a second display surface, the first display surface and the second display surface being positioned back to back and each facing to a side of the vehicle cabin, the display device further includes
- a first imager that is configured to capture an image of the vehicle cabin on the second display surface side, the image captured by the first imager being displayed on the first display surface,
- a second imager that is configured to capture an image of the vehicle cabin on the first display surface side, the image captured by the second imager being displayed on the second display surface, and the processor is configured to perform image recognition on the image captured by each of the first imager and the second imager, and the display control unit is configured to, when the second processor recognizes a person in the captured image, generate the captured image in which an image region of the recognized person is replaced with the virtual object of the departure point to display the captured image on each of the first display surface and the second display surface.

\* \* \* \* \*